Patented Jan. 14, 1930

1,743,243

UNITED STATES PATENT OFFICE

WINFIELD SCOTT, OF AKRON, OHIO, ASSIGNOR TO THE RUBBER SERVICE LABORATORIES COMPANY, OF AKRON, OHIO, A CORPORATION OF OHIO

VULCANIZATION OF RUBBER

No Drawing.   Application filed September 28, 1927.   Serial No. 222,688.

The present invention is directed to the manufacture of vulcanized rubber by a process wherein there is employed as an accelerator of that step the product formed by reacting an organic derivative of ammonia upon a cyanogen halide reaction product of a mercaptan. The manufacture of such accelerators and the method of employing them in a rubber mix will be understood from the following description and examples of the process.

A preferred mode of manufacturing the accelerators of the type set forth herein is as follows. An aromatic mercapto compound or metallic salt thereof, for example, sodium mercapto-benzo-thiazole, preferably dissolved in a suitable solvent was treated with a cyanogen halide such as a chloride by flowing a stream of the chloride through the solvent until the ensuing reaction was completed. The crude reaction product was then separated from the liquid by filtration means, and the crude product so obtained was washed and dried in any suitable manner.

This crude reaction product was then reacted with an organic derivative of ammonia, preferably organic bases such as an aliphatic or aromatic primary or secondary amine, for example, piperidine, diphenyl-guanidine, hexa-methylene-tetramine, o-toluidine, p-phenylene-diamine and the like. The reaction was carried out by intimately mixing substantially one molecular proportion (approximately 200 parts) of the cyanogen chloride reaction product of sodium mercapto-benzo-thiazole with, for example, one molecular proportion (approximately 210 parts) of di-phenyl-guanidine. The mixture was then slowly heated with constant and efficient stirring until the mass fused together to a thin liquid. In the case of the ingredients mentioned in the example, heating to a temperature of approximately 130 to 150° C. was sufficient to cause the desired combination to take place. Upon cooling, a hard, brittle resin was obtained which could be ground and sifted.

The reaction of a cyanogen halide upon a mercaptan such as an aromatic thiazole, results in the production of a mixture of varying proportions of a thiazole mono-sulfid, di-sulfid and thio-cyanate. Such mixtures as described above have been reacted with various primary and secondary aliphatic and aromatic amines to produce vulcanization accelerators of the type set forth herein.

A typical example of the use of the accelerators hereinbefore set forth in the manufacture of a vulcanized rubber product is the following composition characteristic of a so-called pure gum compound. A rubber stock was mixed in the well known manner comprising 100 parts of pale crepe rubber, 5 parts of zinc oxide, 3.5 parts of sulphur, 0.5 parts of the di-phenyl-guanidine derivative of the reaction product of cyanogen chloride and sodium mercapto-benzo-thiazole.

This stock was then vulcanized by heating samples of the stock for varying times in a press maintained under the temperatures given by pressures of twenty and forty pounds of steam per square inch. The cured products were then tested and the following results were obtained:

| Time of cure | Modulus of elasticity in lbs./in² at elongations of— | | | Tensile in lbs./in² at break | Ultimate elongation |
|---|---|---|---|---|---|
| | 300% | 500% | 700% | | |
| 15 minutes at 40 lbs. steam pressure | 181 | 397 | 1763 | 3070 | 805% |
| 0 minutes at 40 lbs. steam pressure | 233 | 518 | 2135 | 3705 | 805% |
| 30 minutes at 20 lbs. steam pressure | 164 | 388 | 1620 | 3285 | 833% |

The above results show that a vulcanized product is obtained by curing a rubber stock under the conditions set forth.

The example hereinbefore given is to be understood as illustrative only and not at all limitative of the scope of the invention. Examples of the use of the preferred type of accelerator in different rubber stocks wherein other compounding ingredients and other proportions of ingredients than those set forth in the examples given are apparent to those skilled in the art to which this invention pertains.

Furthermore, the invention is not to be considered as dependent upon any theory advanced by way of explanation of the chemical changes taking place in the manufacture of the type of accellerator described, but is limited solely by the following claims attached hereto as a part of this specification wherein I intend to claim all novelty inherent in my invention as is permissible in view of the prior art.

What is claimed is:

1. A process of manufacturing vulcanized rubber which comprises heating rubber and a vulcanization agent in the presence of an accelerating composition comprising the reaction product of an organic base upon the cyanogen halide derivative of an aromatic mercapto thiazole compound.

2. A process of manufacturing vulcanized rubber which comprises heating rubber and a vulcanization agent in the presence of an accelerating composition comprising the reaction product of an organic ammonium derivative upon the cyanogen halide derivative of an aromatic mercapto thiazole compound.

3. A process of manufacturing vulcanized rubber which comprises heating rubber and a vulcanization agent in the presence of an accelerating composition comprising the reaction product of an amine upon the cyanogen halide derivative of an aromatic mercapto thiazole compound.

4. A process of manufacturing vulcanized rubber which comprises heating rubber and a vulcanization agent in the presence of an accelerating composition comprising the reaction product of a secondary aliphatic amine upon the cyanogen chloride derivative of the metallic salt of an aromatic mercapto thiazole compound.

5. A process of manufacturing vulcanized rubber which comprises heating rubber and a vulcanization agent in the presence of an accelerating composition comprising the reaction product of di-phenyl-guanidine upon the cyanogen chloride derivative of sodium mercapto-benzo-thiazole.

6. A process of manufacturing vulcanized rubber which comprises heating rubber and a vulcanization agent in the presence of an accelerating composition comprising the reaction product of di-phenyl-guanidine upon mercapto-benzo-thiazole-thiocyanate.

7. A vulcanized rubber product comprising the product obtained by heating a mixture of rubber and sulphur in the presence of an accelerator, said accelerator comprising the reaction product of an organic base upon the cyanogen halide derivative of an aromatic mercapto thiazole compound.

8. A vulcanized rubber product comprising the product obtained by heating a mixture of rubber and sulphur in the presence of an accelerator, said accelerator comprising the reaction product of an organic ammonium derivative upon the cyanogen halide derivative of an aromatic mercapto thiazole compound.

9. A vulcanized rubber product comprising the product obtained by heating a mixture of rubber and sulphur in the presence of an accelerator, said accelerator comprising the reaction product of an amine upon the cyanogen chloride derivative of an aromatic mercapto thiazole compound.

10. A vulcanized rubber product comprising the product obtained by heating a mixture of rubber and sulphur in the presence of an accelerator, said accelerator comprising the reaction product of a secondary aliphatic amine upon the cyanogen chloride derivative of the metallic salt of an aromatic mercapto thiazole compound.

11. A vulcanized rubber product comprising the product obtained by heating a mixture of rubber and sulphur in the presence of an accelerator, said accelerator comprising the reaction product of di-phenyl-guanidine upon the cyanogen chloride derivative of sodium mercapto-benzo-thiazole.

12. A vulcanized rubber product comprising the product obtained by heating a mixture of rubber and sulphur in the presence of an accelerator, said accelerator comprising the reaction product of di-phenyl-guanidine upon mercapto-benzo-thiazole thiocyanate.

13. A rubber vulcanization accelerator comprising the reaction product of an organic ammonium derivative upon the cyanogen halide derivative of an aromatic mercapto thiazole compound.

14. A rubber vulcanization accelerator comprising the reaction product of a secondary amine upon the cyanogen chloride derivative of an aromatic mercapto thiazole compound.

15. A rubber vulcanization accelerator comprising the reaction product of di-phenyl-guanidine upon the cyanogen chloride derivative of sodium mercapto-benzo-thiazole.

In testimony whereof I have affixed my signature.

WINFIELD SCOTT.